United States Patent [19]
Macier et al.

[11] Patent Number: 5,332,368
[45] Date of Patent: Jul. 26, 1994

[54] AIR COMPRESSOR HAVING A HIGH PRESSURE OUTPUT

[75] Inventors: John E. Macier, Beach Park, Ill.; John M. Mahoney, III, Bristol, Wis.; Harold K. Wade, Waukegan, Ill.

[73] Assignee: Outboard Marine Corporation, Waukegan, Ill.

[21] Appl. No.: 918,582

[22] Filed: Jul. 22, 1992

[51] Int. Cl.⁵ .............................. F04B 17/00
[52] U.S. Cl. ...................... 417/362; 417/364; 417/501
[58] Field of Search .......... 417/501, 491, 534, 362, 417/364, 372, 570

[56] References Cited

U.S. PATENT DOCUMENTS

| | | |
|---|---|---|
| 970,487 | 9/1910 | Gardner ................. 417/501 X |
| 1,400,755 | 12/1921 | McCuen . |
| 1,401,102 | 12/1921 | Heideman . |
| 1,462,695 | 7/1923 | Hanson et al. . |
| 1,471,820 | 10/1923 | Beam . |
| 1,493,935 | 5/1924 | Hack . |
| 1,511,376 | 10/1924 | Spreen . |
| 1,535,643 | 4/1925 | Astrom . |
| 1,549,064 | 8/1925 | Cooke . |
| 1,879,947 | 9/1932 | Peter . |
| 1,883,328 | 10/1932 | Bihl et al. . |
| 2,436,854 | 3/1948 | Corey . |
| 2,469,998 | 5/1949 | Smith . |
| 2,751,146 | 6/1956 | Moseley ................. 417/501 X |
| 2,985,358 | 5/1961 | Lee et al. . |
| 4,417,857 | 11/1983 | Sudbeck . |
| 4,655,693 | 4/1987 | Grime ................... 417/362 X |
| 4,689,025 | 8/1987 | Ferguson . |
| 5,041,034 | 8/1991 | Sakamoto . |
| 5,054,457 | 10/1991 | Sakamoto . |

FOREIGN PATENT DOCUMENTS 63-179130 7/1988 Japan .................. 123/560

Primary Examiner—Richard E. Gluck
Attorney, Agent, or Firm—Greer, Burns & Crain, Ltd.

[57] ABSTRACT

An air compressor of compact design which has the capability of providing a relatively high pressure, relatively low volume output, and which is capable of operating over an extended range of speeds. A drive pulley is connected to a crankshaft structure and the crankshaft structure is connected to a reciprocating piston via a connecting rod. The piston reciprocates in a cylinder bore that has side inlets for admitting air and the piston compresses the air which is forced through a reed valve mechanism into an output chamber that communicates with an air pressure regulator for providing a constant desired output pressure.

56 Claims, 8 Drawing Sheets

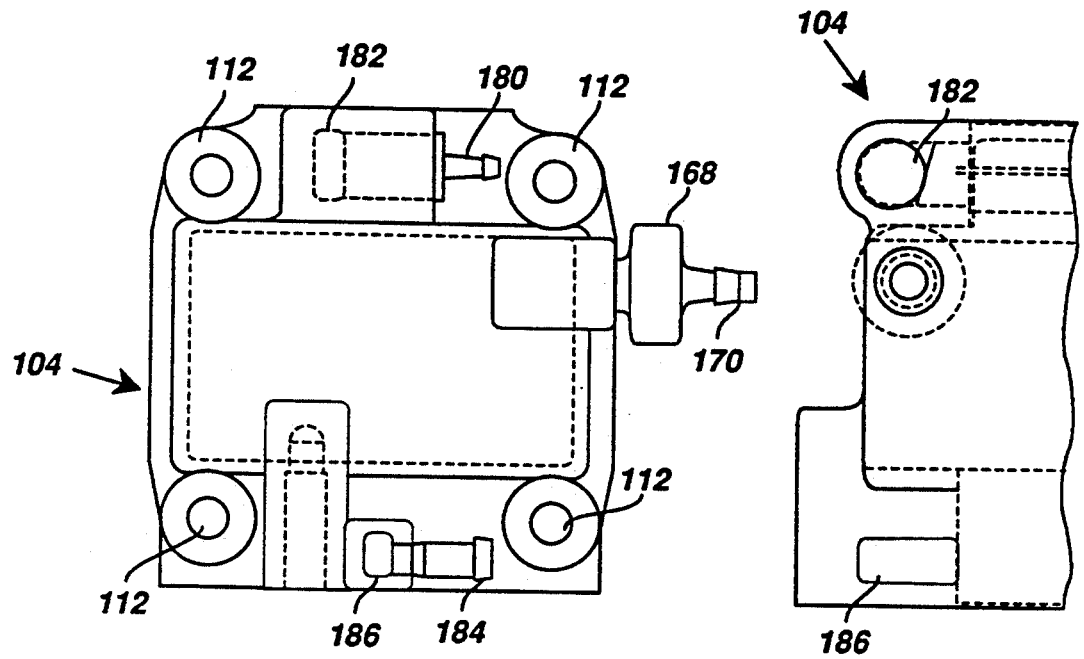
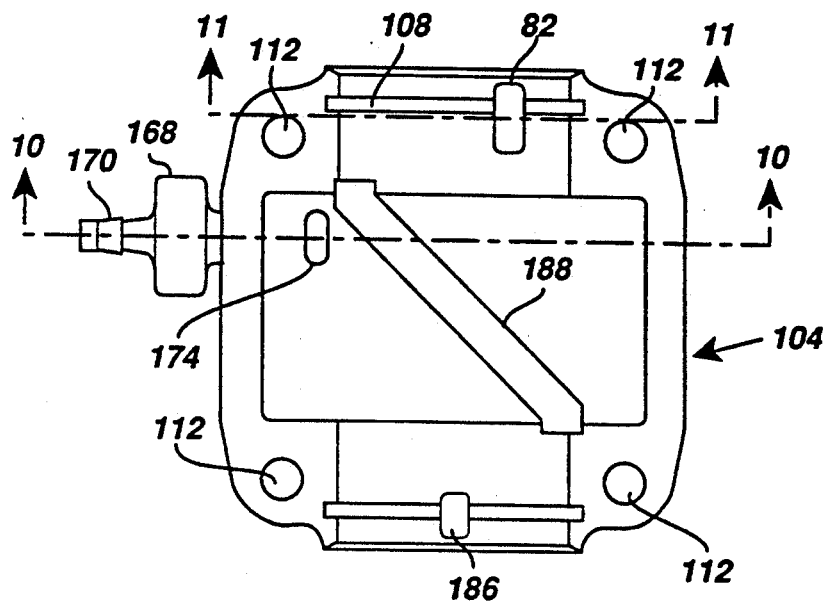

AIR COMPRESSOR HAVING A HIGH PRESSURE OUTPUT

CROSS REFERENCE TO RELATED APPLICATIONS

Macier et al., Ser. No. 07/918,444, entitled "Integral Bracket and Idler Assembly" filed Jul. 22, 1992.

Macier et al., Ser. No. 07/918,261, entitled "Cylinder Head Expansion Chamber", filed Jul. 22, 1992.

FIELD OF THE INVENTION

The present invention generally relates to air compressors, and more particularly relates to a relatively high output pressure, low volume air compressor that is particularly adapted for use in fuel injection systems for internal combustion engines.

BACKGROUND OF THE INVENTION

There have been many different types of air compressors developed over the decades for particular uses and applications, with design considerations being tailored to each particular application. Without chronicling the developmental history of the various types of air compressors, recent developments in fuel injection systems for internal combustion engines have created a need for a compact, high pressure, low volume air compressor that reliably operates over an extended range of operating speed. Such an air compressor is particularly useful for such a fuel injection system that is used on 2-cycle engines, such as outboard motors and the like, which generate substantial horsepower even though the engines are of relatively small size. Because of the relatively small size of the engine itself, the air compressor which is driven by the engine must occupy a relatively small volume and yet produce high pressure at operating speeds experienced during cranking during starting and from idle to full throttle speed.

Accordingly, it is a primary object of the present invention to provide an improved air compressor which has the capability of providing high output pressure with reasonable output volume at varying operating speeds, and which is reliable in its operation over such varying operating speeds.

Yet another object of the present invention is to provide such an improved air compressor which exhibits reliable operation and which is lubricated and also water cooled.

Another object of the present invention is to provide such an improved air compressor which utilizes a reciprocating piston connected to a crankshaft assembly by a connecting rod and which utilizes a side inlet for air that is to be compressed and has a reed valve at the output thereof which is covered by a cylinder head and defines a relatively small output chamber that acts to reduce the amplitude of the pressure spikes that are produced by the reciprocating piston.

A related object lies in the provision of a tube connected to the output chamber for providing an increased volume which acts as an accumulator for the compressed air.

Another object lies in the provision of the crankcase being pressurized and operating to provide an auxiliary pressure source, albeit at lower pressure levels, for driving other devices associated with the engine, such as a low pressure fuel pump or the like.

Still another object of the present invention is to provide a power take-off connected to the crankshaft of the compressor for driving other auxiliary devices of the engine to which the air compressor is attached, such as power steering.

Another object of the present invention is to provide a sophisticated oil lubrication system for the compressor and particularly the piston thereof, which includes multiple piston rings, including an oil communicating piston ring and piston that operate to recover the lubricating oil between the cylinder wall and the piston.

A related object of the present invention lies in the provision of controlling the oil that is admitted into and removed from the crankcase during operation, particularly in light of the pressures that are developed within the crankcase which would otherwise disrupt the normal flow of oil into and out of the crankcase.

Yet another object of the present invention is to provide an improved air compressor which is compact and of superior design and which includes a simple and effective means in which to secure the crankshaft assembly within the crankcase, which enables easy insertion and removal.

Other objects and advantages will become apparent upon reading the following detailed description, in conjunction with the attached drawings, in which:

FIG. 7 is a right side elevation of a portion of the air compressor shown in FIG. 2;

FIG. 8 is a side elevation of the structure shown in FIG. 7;

FIG. 9 is a right side elevation of the structure shown in FIG. 8;

DETAILED DESCRIPTION

Broadly stated, the present invention is directed to an air compressor of compact design which has the capability of providing a relatively high pressure, relatively low volume output, and which is capable of operating over an extended range of speeds, such as would be experienced if the air compressor were driven by an internal combustion engine, such as an outboard motor. The air compressor is driven by an outside source, such as by an outboard engine via a drive belt which drives a drive pulley.

The drive pulley is connected to a crankshaft structure and the crankshaft structure is connected to a reciprocating piston via a connecting rod. The piston reciprocates in a cylinder bore that has side inlets for admitting air and the piston compresses the air which is forced through a reed valve mechanism into an output chamber that communicates with an air pressure regulator for providing a constant desired output pressure.

The present invention is adapted to provide an output pressure of preferably about 80 pounds per square inch, although the air compressor is capable of producing pressures greatly in excess of that value, depending upon the speed of operation. In one particular application contemplated, the air compressor is used to supply air to a fuel injection system for an internal combustion engine such as an outboard engine, and in that application, the air compressor operates in association with an air pressure regulator to maintain a generally constant pressure supply that is used by the fuel injection system. Since the desired output pressure is 80 pounds per square inch, the present invention is adapted to provide pressure somewhat higher than such value, i.e., at about 90 p.s.i., with a volume of approximately 1.6 cubic feet per minute when the crankshaft of the compressor is operated at approximately 610 revolutions per minute. A typical idle speed of an outboard engine to which the air compressor can be attached may be in the range of 550 to 650 rpm. If the idle speed of the engine is the low 550 rpm value, then the pulleys of the motor and the air compressor must be sized so that the air compressor is operated at approximately 610 rpm. When the engine is operating at full throttle, which is typically approximately 6,000 revolutions per minute, the output pressure is still maintained at 80 p.s.i. by virtue of the air pressure regulator connected to the output chamber, but at such speeds, the volume of air generated is approximately seven cubic feet per minute.

Figure 18:
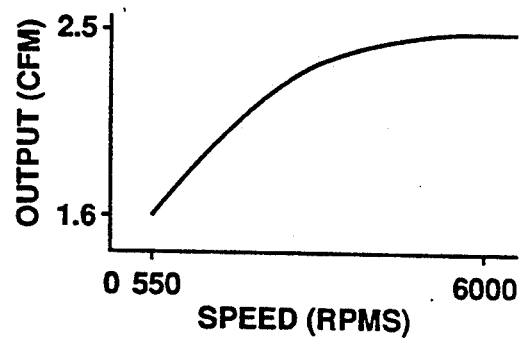
FIG. 18 is a graph of the operating speed versus output volume of the air compressor embodying the present invention.

The speed versus output volume characteristics is shown in FIG. 18, and indicates that it is generally linear until the operating speed increases to the upper portion of its range. However, at the upper range the efficiency of the compressor generally decreases and the output does not increase linearly as the speed increases. This is due to the inability of the air to fill the cylinder bore from the inlet in the shorter time period that the inlet is open during the reciprocating movement of the piston. In the application for supplying compressed air to the fuel injection system for the outboard engine, such decreased efficiency is beneficial for the reason that only approximately 6 CFM of air is needed for the fuel injection system, and the volume of air produced in excess of that value is merely bled off and not used. By not producing much volume in excess of that which is required, such bleeding is minimized, and less work is performed in compressing the air, which increases the available power of the engine.

As will be hereinafter described, the air compressor is driven by a belt from a drive pulley attached to the crankshaft of the engine to a pulley of the air compressor. It should be readily appreciated that the speed of operation of the air compressor can be adjusted relative to the speed of the engine by changing the size of one or the other of the pulleys around which the belt travels.

As will be hereinafter described, by virtue of the fact that the air compressor can be operated through an extreme range of operating speeds, considerable heat will be produced during its operation. For this reason, the compressor has an oil system for lubricating the air compressor and it is also water cooled in the area of the cylinder to effectively dissipate the heat that is generated.

Figure 1:
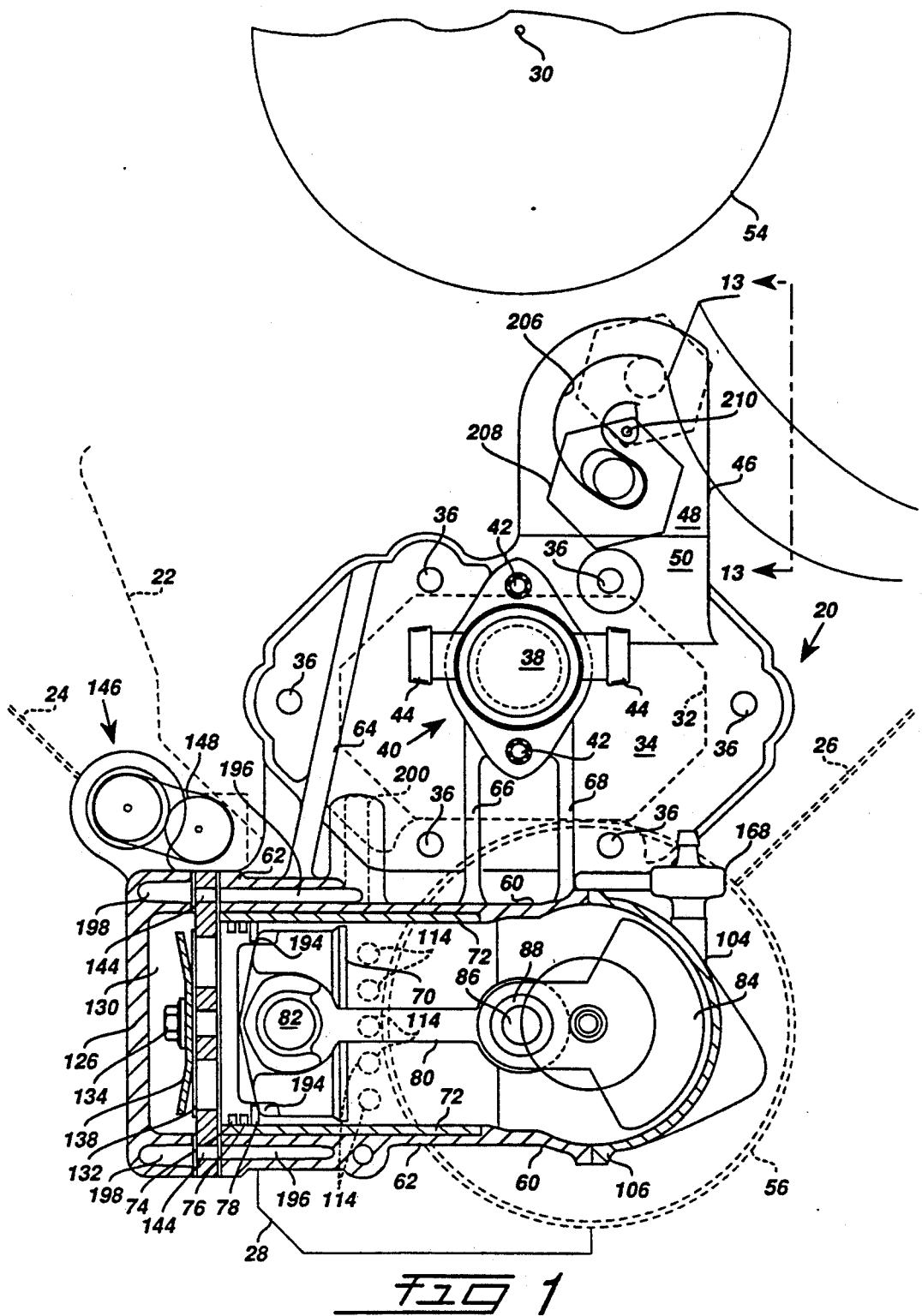
FIG. 1 is a top view with portions removed of the air compressor embodying the present invention and is shown in the environment of an outboard engine.

Turning now to the drawings and particularly FIG. 1, the air compressor, indicated generally at 20, is shown in association with an outboard engine which has an engine block 22 which is part of a V-6 engine that has left and right head faces 24 and 26 broadly illustrated, with the block 22 having a back portion 28. The center line of the engine crankshaft is shown at 30. The block also has an upper opening 32 which contains cooling water on the inside of the block and the air compressor 20 is configured to be mounted to the top of the block and it has a generally mounting bracket portion 34 having a flat undersurface which covers the opening 32 in the block and is bolted to the block by bolts (not shown) that are inserted through six openings 36.

In the central portion of the bracket portion is an aperture 38 and a boss on which a pressure relief valve, indicated generally at 40, is bolted by two bolts 42 that are inserted into threaded apertures and the pressure relief valve 40 has a pair of nipples 44 to which hoses can be attached for passing water from the inside of the block to the engine cylinders. The pressure relief valve 40 is a part of the engine and is not in and of itself part of the present invention, it being shown and located where it is in order to perform its normal function and such a valve 40 is provided in many outboard engines.

It should be readily appreciated that if the air compressor of the present invention were for a different application than that illustrated, there may be no boss or openings 38 and 42 in the bracket portion 34. Additionally, the entire bracket portion 34 may be shaped differently and even substantially eliminated in other applications. The bracket portion 34 also has an outer extension 46, the upper surface 48 of which is at a higher elevation than the general elevation of the bracket portion 34 and the change in elevation is connected by an inclined ramp portion 50. The extension 48 is provided for securing an idler pulley 52 (see FIG. 13).

Figure 2:
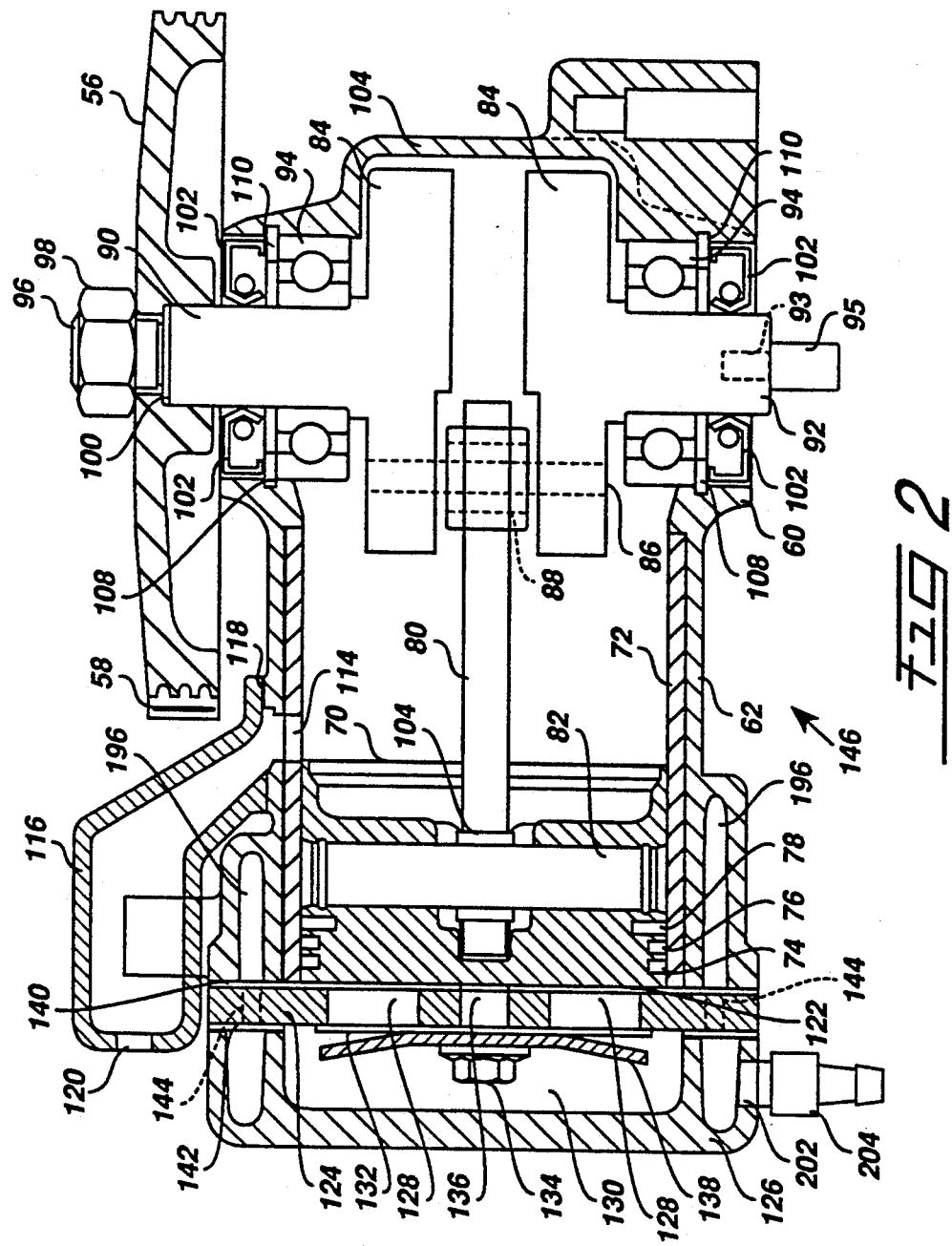
FIG. 2 is a front view of the air compressor shown in FIG. 1, with portions removed and partially in section.

The compressor 20 is driven by a drive pulley 54 mounted to the engine crankshaft via a belt 58 (FIG. 2) with the belt wrapping the pulley 54 and a pulley 56, partially shown in FIG. 1 and best shown in FIG. 2, with the backside of the belt 58 contacting the idler pulley 52. As will be hereinafter described, the idler pulley can be adjusted to vary the tension on the belt.

In accordance with the present invention, the mounting bracket portion 34 is preferably integrally cast with the crankcase 60 and a cylinder casting 62 and reenforcing ribs 64, 66 and 68 are provided to strengthen the overall casting. As is best shown in FIGS. 1 and 2, the air compressor has a piston 70 which fits into a cylindrical bore of the cylinder 62 with the bore being defined by a separate cylindrical sleeve 72 which is preferably cast in place when the cylinder casting 62, crankshaft 60 and bracket portion 34 is cast. The piston has slots near the head portion thereof which receive three rings 74, 76 and 78, with the rings 78 being oil rings which operate to pass oil that may be present between the surface of the piston and the sleeve 72 during operation as will be described.

The piston 70 is connected to a connecting rod 80 by a wrist pin 82 and the other end of the rod 80 is connected to a pair of crankshaft members 84 by a crank pin 86 which fits within a needle bearing assembly 88, the outer surface of which fits within an opening in the connecting rod 80. The crank pin 86 is press fit into apertures in the crankshaft members 84 to maintain the members in fixed position relative to each other. The crankshaft members 84 each have integral cylinder portions 90 and 92, the outer surface of which are supported for rotation in bearings 94, with the cylinder portion 90 having a smaller threaded extension 96 being adapted to receive the pulley 56 and be secured against rotation by a nut 98. As is shown, the pulley 56 has a radially extending shoulder 100 which bears against the end of the cylindrical portion 90 to enable the nut 98 to tighten the pulley 56 against the cylindrical portion 90. Annular seals 102 are provided to prevent oil from escaping from the crankcase, and can be a lip seal manufactured by Chicago Rawhide of Chicago, Ill., for example. The connecting rod 80 has an aperture through which the wrist pin 82 passes, and also another needle bearing assembly 104 is provided between the wrist pin 82 and the opening in the connecting rod to permit rotation of the connecting rod relative to the cylinder during operation.

Because the cylindrical portion 92 extends beyond the opening, it is available for providing a power take off for powering other components, such as a power steering pump, if desired. This is accomplished by a threaded opening 93 into which a jack shaft 95 or the like can be attached to the crankshaft cylindrical portion 92.

It should be understood that the crankshaft must be inserted into the crankcase and the integral casting comprising the mounting bracket 34, the cylinder casting 62 and a portion of the crankcase 60 is a one piece construction. The crankcase has a split construction with an end casting 104 being removable from the portion of the casting 60 along separation line 106. The casting 104 is shown in FIGS. 7-11 in detail. Referring to FIG. 9, which shows an inside view of the casting 104, such as would be taken along the separation line 106 in FIG. 1 looking to the right, the casting has a pair of annular grooves 108 each of which is adapted to receive a C-shaped retaining ring 110 (FIG. 2) with the retaining rings contacting the outer side of the ball bearing assemblies 94. The seals 102 abut the other side of the retaining rings 110. It should be understood that the grooves 108 are also provided in the crankcase casting portion 60 so as to provide a substantially continuous annular groove in which the C-shaped retaining rings can fit. In lieu of the preferred C-shaped retaining rings, a flat washer can be used. The use of the retaining rings results in a simple and inexpensive but effective means in which to accurately position the crankshaft members 84 within the crankshaft and enables easy assembly and disassembly. As is shown in FIGS. 7 and 9, the end casting 104 is attached to the portion 102 by four bolts (not shown) which are inserted through openings 112.

From the foregoing description of the structure of the crankcase assembly and piston 70 and the connecting rod 80 and associated components, it should be understood that the pulley 56 which is connected to the motor or other source of power is driven by the belt 58 and it rotates the crankshaft which causes the piston 70 to be reciprocated within the cylindrical bore defined by the cylindrical sleeve 72.

The sleeve 72 as well as the cylinder casting 62 have a number of openings 114 which admit air into the bore at two distinct times during operation of the compressor. One is during the compression of air for the main output which occurs when air is admitted into the bore when the piston is at its bottom dead center position which is when the piston 70 is to the right of the position shown in both FIGS. 1 and FIG. 2. The other is when it is at the position shown in FIGS. 1 and 2 which admits air into the cylinder so that when the piston moves to the right from top dead center toward bottom dead center, air is compressed within the crankcase for providing an auxiliary output albeit at a lower pressure level.

Such air admitting capability at two positions of the piston results from the fact that the inlet openings 114 are positioned generally midway along the stroke of the piston, and the length of the side wall of the piston is less than one half of the length of the stroke of the piston.

The openings 114 are also shown in phantom in FIG. 1 and comprise five openings, each of which are preferably approximately ⅜ inches in diameter. With the view of FIG. 1, the openings would actually be above the connecting rod 80 in a portion of the cylinder wall 62 that has actually been removed. The position of the openings relative to the end of the piston at bottom dead center is preferably approximately 0.075 inches from the edge of the opening nearest the left side of FIG. 1. This results in an effective opening that comprises a portion of the circular opening and measures approximately 0.075 inches by approximately 0.400 inches.

The position of the openings relative to the head end of the cylindrical bore, i.e., the left end as shown in FIG. 1, can affect the output characteristics illustrated in FIG. 18. If the openings are positioned farther from the head end, the effective stroke of the piston is increased and the compressor will be more efficient at low operating speeds. If the openings are positioned closer to the head end, the compressor will be more efficient at higher speeds, since during the reciprocating movement of the piston, the openings 114 will be uncovered longer and more air will be admitted to the bore.

An air intake manifold 116 is provided in the area of the openings 114 and is attached to the cylinder casting 62 by bolts (not shown) and the intake manifold 116 preferably has a gasket 118 located at the interface between the manifold and the cylinder casting 62. The manifold has an air intake opening 120 for admitting air into the manifold. The inside of the manifold 116 preferably has a filter means (not shown) for preventing dirt, debris and the like from entering the cylinder. As is best shown in FIG. 2, the piston 70 has an end surface 122 that is flat and the stroke of the piston is preferably such that the end surface 122 closely abuts a reed plate 124 that is located between the cylinder 62 end surface and a cylinder head 126. The reed plate 124 has output openings 128, of which there preferably are eight which communicate the bore with a cylinder head output chamber 130. The reed plate must be sufficiently thick that it does not deform under the temperature and pressure levels that are experienced, but should be as thin as otherwise possible to achieve greater compression of the air during movement of the piston. Such thin construction reduces the volume between the bottom of the reed valve 132 and the top of the piston at top dead center which gives a greater compression ratio.

Figure 17:
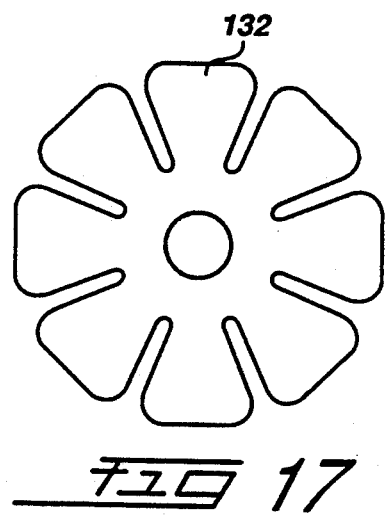
FIG. 17 is a plan view of the reed valve used in the present invention.

A reed valve 132 is provided and is in the shape of an eight pedal configuration as shown in FIG. 17, with the valve having a center opening through which a bolt 134 can be tightened into a threaded opening 136 in the reed plate 124. There is a reed stop member 138 provided which limits the movement of the pedals of the reed valve 132 and its shape is substantially the same as the shape of the reed valve 132 although somewhat smaller in size.

As shown in FIG. 2, the pedals of the reed stop member 138 are angled away from the reed plate 124 so that the reed valve pedals can flex in response to pressure being produced by the action of the piston during its leftward stroke as shown to communicate the compressed air into the output chamber 130 and when the piston moves to the right, the reed valve pedals will return to the position as shown which closes the valve so that the pressure within the chamber 130 is not reduced with rightward movement of the piston 70.

In accordance with an important aspect of the present invention, the reed valve 132 is preferably manufactured from stainless steel flapper valve stock having a thickness of preferably 0.011 inch and the shape of the openings 128 are the same as the shape of the individual pedals, with the pedals being slightly larger than the openings 128 so that the pedals will not be sucked into the opening upon closure of the valve. In this regard, there is an overlap between the outer edges of each pedal and the opening 128 so that the reed plate provides an abutting surface for stopping the petals of the reed valve 132 and it is preferred that the overlap be approximately 0.060 inch given the pressure levels that are being produced by the present invention. The reed petals operate in response to the differential pressure within the cylindrical bore exceeding the pressure in the output chamber 130. With the construction of the petals as described above, sufficient flexing to open the valve will occur with a differential pressure of approximately 5 pounds per square inch. The described construction of the petals provides sufficient rigidity to withstand the differential pressure of the output chamber relative to the cylindrical bore when the piston is moving toward the right which can be approximately 90 pounds per square inch.

The reed stop member 138 is provided to limit the movement of the reed valve during operation. The shape of the stop member 138 is substantially the same as the reed valve itself (see FIG. 17) but is slightly smaller in size as shown in FIGS. 1 and 2. The stop member 138 is fabricated from metal that is sufficiently rigid that it will stop the flexing of the reed valve 132. The stop member is also angled away from the reed plate 124 as shown in FIGS. 1 and 2 to permit limited flexing of the valve. A gasket 140 is provided to seal the reed plate 124 and the cylinder wall 62 and a second gasket 142 is provided between the reed plate and the cylinder head 126. The gasket extends around the outer periphery of the reed plate, but also have a number of openings 144 therein for communicating cooling water during operation as will be hereinafter described.

Figure 3:
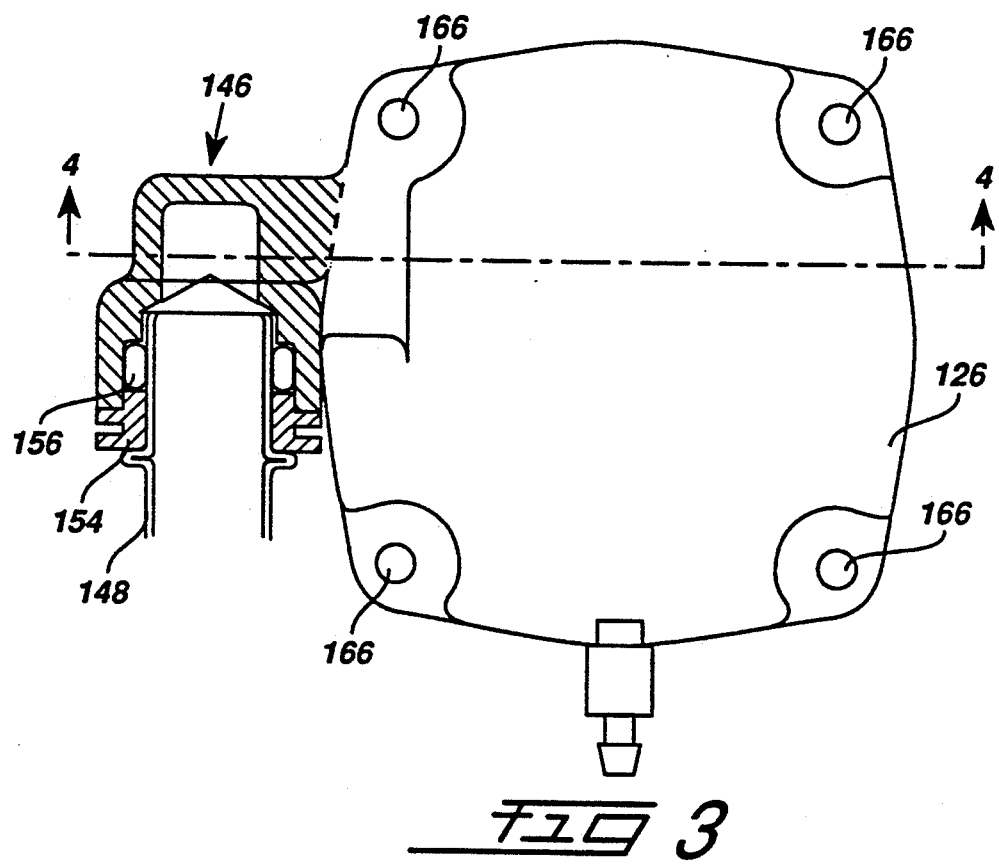
FIG. 3 is a left end view of the air compressor shown in FIG. 2 and particularly illustrating the cylinder head.
Figure 4:
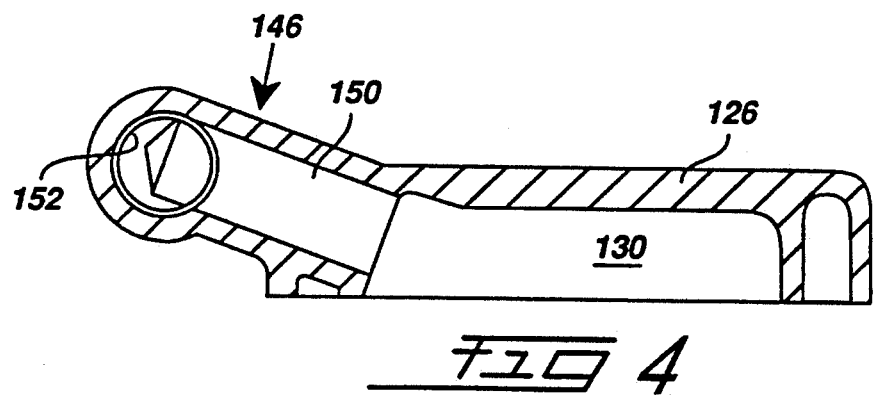
FIG. 4 is a cross-section taken generally along the line 4—4 of FIG. 3.
Figure 5:
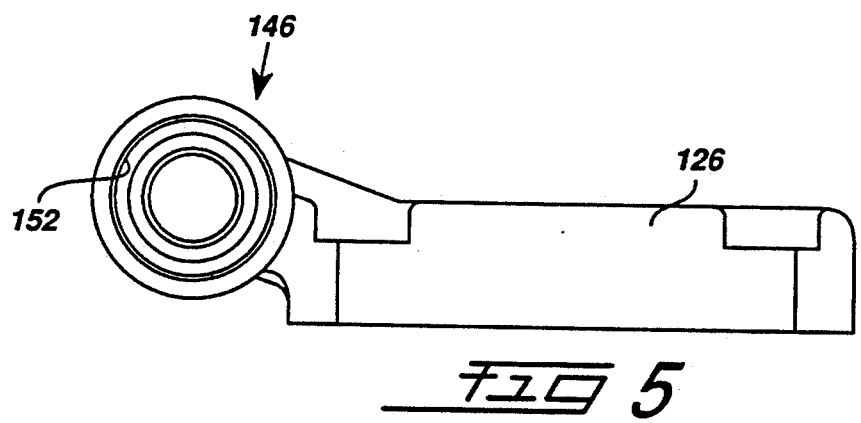
FIG. 5 is a front elevation of the cylinder head of FIG. 3.

With respect to the output chamber 130, and referring to FIGS. 1, 3-5 and 15, the cylinder head has an extension, indicated generally at 146, for connecting to a tube 148 that provides an increased capacity volume to the output chamber 130 and which functions as an accumulator. The extension has an internal port 150 which communicates the chamber 130 to a transverse opening 152 in which the tube 148 is connected. As best shown in FIG. 3, the tube has an outer annular fitting 154 for attachment to the opening 152 and an O-ring seal 156 is provided to prevent leakage of air from the inside of the tube and from the chamber 130. The seal 156 is preferably manufactured from a viton or other material that is capable of withstanding operating temperatures of up to 600 degrees F. The head is attached to the casting 62 by bolts (not shown) which are inserted through openings 164 of the head 166.

Figure 15:
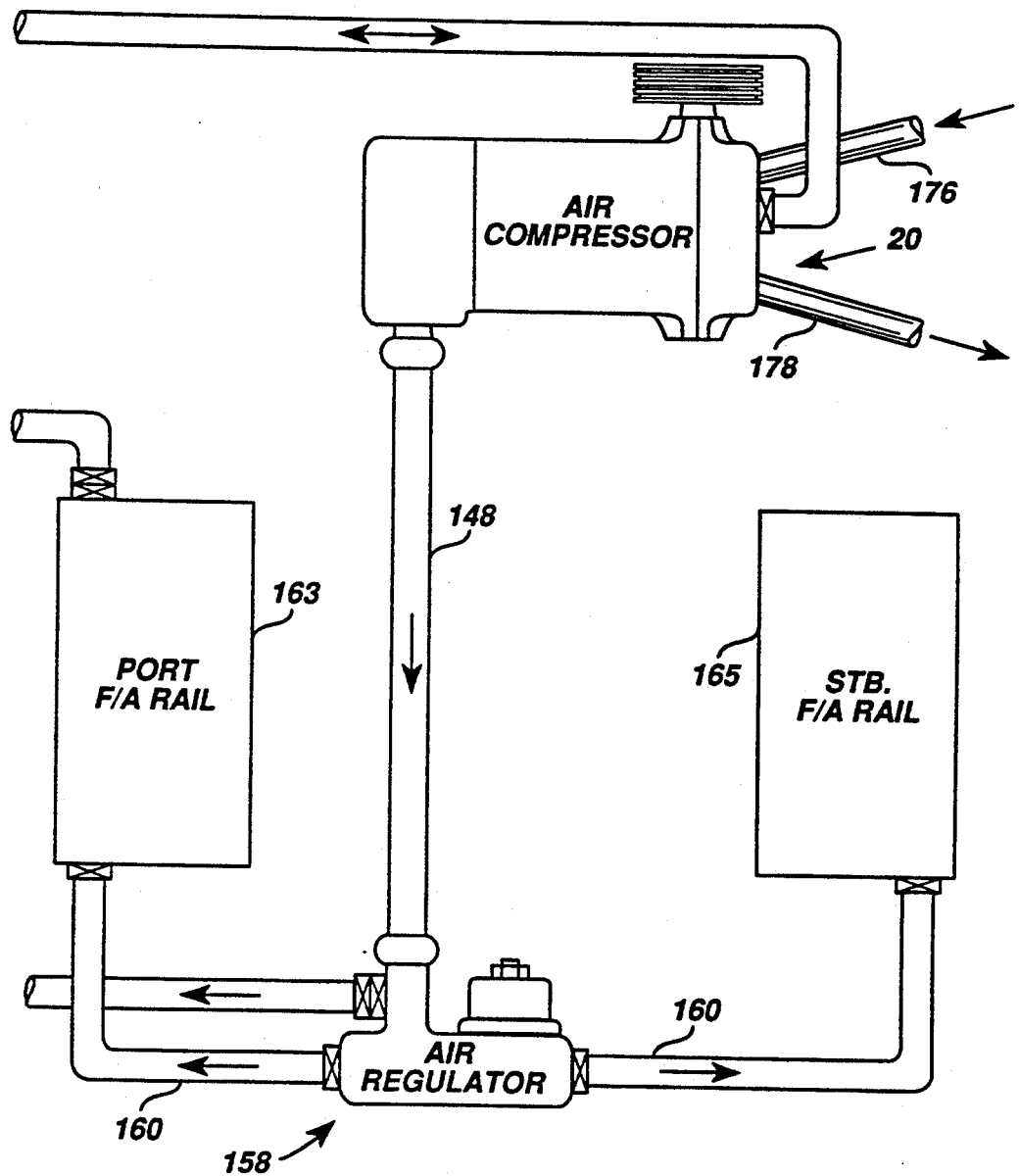
FIG. 15 is a simplified schematic illustration of the air compressor embodying the present invention shown with the output tube and also shown in conjunction with an air regulator and portions of a fuel injection system for an outboard engine.

As shown in FIG. 15, the tube 148 is connected to an air pressure regulator 158 which is of conventional construction and limits the air pressure within the tube to the desired level, which is preferably approximately 80 lbs./sq. inch in the preferred embodiment. The output lines 160 from the regulator are provided for communicating the air pressure to port and starboard fuel and air rails 163 and 165 which are part of the fuel injection system of the engine and are not in and of themselves part of the present invention.

It is preferred that the volume of the tube 148 and the output chamber 130 be on the order of approximately 200 cubic centimeters in total. The chamber 130 preferably has a volume of approximately 50 cubic centimeters and the conduit 148 preferably has a volume of approximately 150 cubic centimeters. The tube 148 is shown in FIG. 15 and may be on the order of approximately one foot in length, with it extending generally the full length of the engine block. As shown in FIG. 1, the tube has two angles which permit it to be positioned immediately adjacent the engine block 22 as it extends along the length thereof. It should be understood that the length of the tube as well as its internal diameter necessary affect its volume, and in the particular application of the compressor which is shown in conjunction with an internal combustion engine, the total capacity of the chamber 130 and the tube 148 is preferably approximately 200 cubic centimeters.

The size of the expansion chamber and tube should be large enough to act to dampen the high pressure spikes produced by the operation of the air compressor, but should not be too large so that it takes too long to fill up so that the engine must crank excessively before enough pressure is produced to start the engine. In the preferred embodiment which is intended for use on a 3-liter V-6 type internal combustion engine, the expansion chamber is preferably rigid in order to withstand the heat that is produced during operation of the compressor, but can be flexible if made with a material that will not break down by heat. If flexible, it would aid in the dampening effect.

It should also be understood that the chamber 130 can be increased in size from that shown, but the physical size of the compressor in its preferred embodiment illustrated dictates that the cylinder head 126 not extend beyond the boundaries defined by the drawing of FIGS. 1 and 2.

As previously mentioned, the compressor is adapted to provide an auxiliary pressure output that is generated by air being compressed within the crankcase during the reverse or rightward stroke of the piston 70. This occurs by air being admitted into the cylindrical bore through the openings 114 when the piston has moved through its stroke to top dead center and upon the return stroke, the piston will move to the right and seal the openings 114 by the side wall of the piston 70 and cause compression of the air in the crankcase during movement of the cylinder to bottom dead center.

Figure 10:
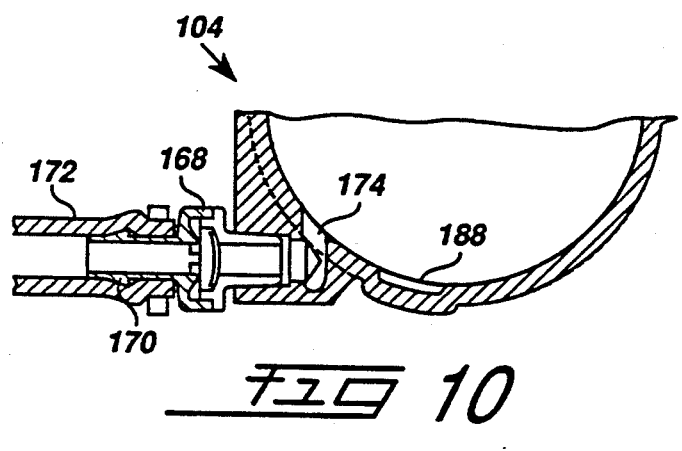
FIG. 10 is a cross-section taken generally along the line 10—10 of FIG. 9.
Figure 11:
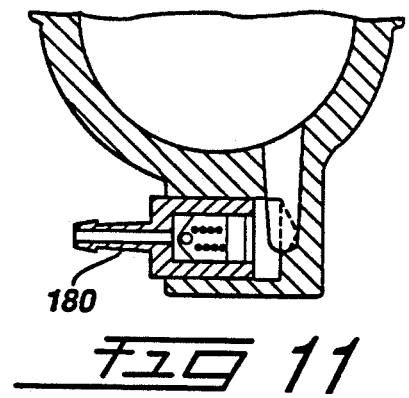
FIG. 11 is another cross-section taken generally along the line 11—11 of FIG. 9.

The level of pressurization is significantly less than that developed in the output chamber 130, the level being on the order of approximately 10 p.s.i. and with such reduced pressure levels, the output of the auxiliary pressure from the crankcase is controlled by a check valve 168 which is shown in FIGS. 1, 7 and 10. The check valve 168 preferably has a nipple 170 integrally formed therein to which the tube such as 172 can be attached for applying the pressure to an auxiliary component such as a low pressure fuel delivery pump or an oil metering pump or the like. The check valve 170 communicates with the interior of the crankcase through a port 174 and is preferably of the type which opens and closes with very little differential pressure being applied in either direction across the valve.

To lubricate the piston as well as the bearings in the crankcase, the air compressor utilizes an oil lubrication system that will include an oil inlet line 176 (see FIG. 15) and an oil outlet line 178 which are connected to an oil distributor pump. Referring to FIG. 7, the line 176 is attached to a check valve 180 that is connected to the end casting 104 and which communicates to the crankcase via an internal port 182. The oil outline 178 is connected to an orificed drain fitting 184 as shown in FIG. 7, with the drain fitting 184 being in communication with the crankcase via an internal port 186 shown in FIGS. 7, 8 and 9.

It should be understood that the position of the oil inlet check valve 180 is at the top of the crankcase whereas the oil return or orificed drain fitting 184 is located at the bottom thereof to utilize the effect of gravity to aid in the circulation of oil in the crankcase, it being understood that the crankcase is not filled with oil, but sufficient oil flows through the crankcase to maintain proper lubrication. Also, the position of the outlet check valve 168 which provides the source of auxiliary pressure is located near the top of the crankcase.

In accordance with an important aspect of the present invention, the check valve 180 and drain fitting 184 are employed due to the fact that the crankcase is used to generate the source of auxiliary air pressure. Rather than pumping oil through the crankcase, the pressure levels within the crankcase provide a negative pressure that has the effect of sucking oil into the crankcase through the inlet. The pressure levels within the crankcase produces a negative value of approximately 4 p.s.i. relative to the oil in the inlet line. The check valve 180 opens only when the differential pressure of the oil supply line exceeds the pressure in the crankcase by approximately 10 pounds per square inch. Thus, during operation, the check valve 180 will open and permit oil to be pumped into the crankcase when the pressure differential pressure exceeds this value, and oil will not be sucked into the crankcase during operation.

The oil pressure typically provided in the line 176 is a minimum of approximately 10 p.s.i. The oil drain 184 has an orifice which is sufficiently large that all of the oil that enters the crankcase can drain out, but it is small enough that it does not prevent pressure to be built up within the crankcase for providing the auxiliary pressure source for running other components are previously described. In this regard, it has been found that an orifice having a diameter of approximately 0.030 inches is sufficient to achieve reasonable pressure levels and also drain the oil from the crankcase at a desired rate of flow.

To aid in having the flow of oil extend from the inlet port 182 to the outlet port 186 and keeping in mind that the outer reach of the crankshaft 84 is close to the size of the opening in the end casting 104, an oil groove 188 is provided in the inside of the crankcase as shown in FIGS. 9 and 10.

Figure 14:
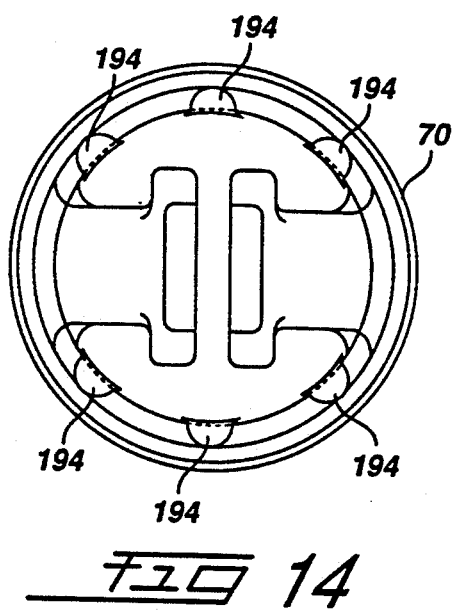
FIG. 14 is an end view of the piston that is used in the air compressor of the present invention.
Figure 16:
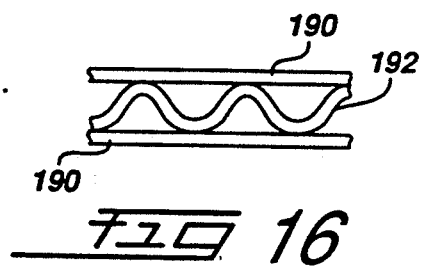
FIG. 16 is a side elevation of a portion of the oil ring construction used with the piston of the present invention.

It should be appreciated that oil will also migrate to the piston 70 and will lubricate the piston within the sleeve 72. Since it is important to minimize the amount of oil that may be present in the output pressure air, for the reasons that have been hereinbefore stated, the three rings 74, 76 and 78 are provided, with one of the rings 78 being an oil ring. As such, the oil ring 78 has a composite construction which consists of upper and lower thin ring components 190 between which is sandwiched a corrugated component 192 as shown in FIG. 16. This corrugated construction enables oil to pass through the ring during operation and the oil is then able to travel to the interior of the piston by means of six openings 194 that are present in the piston as shown in FIGS. 1 and 14. More specifically, there are recesses cast in the piston in six locations in the axial direction as shown in FIG. 14 and when the groove is machine cut for the ring 78, an opening is cut in the side of the piston through which oil can pass to the interior of the piston 70 at these locations 194.

Figure 6:
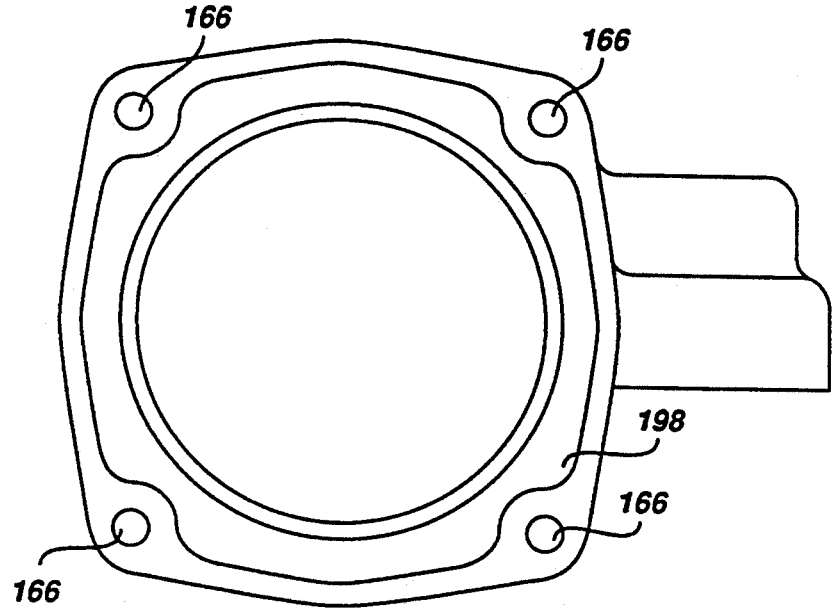
FIG. 6 is a bottom view of the cylinder head of FIG. 3.

Because of the heat generated by the air compressor, a cooling system is provided for the cylinder head area and to this end, the cylinder 62 has a space 196 extending substantially around the entire cylinder as does the cylinder head 126, it being shown as the area 198 (see FIG. 6). As previously mentioned, the compressor has the mounting bracket portion 34 which fits over an opening in the engine block which contains cooling water and water from this area is communicated to the openings 196 and 198 via a port 200 (see FIGS. 1 and 12) that extends from the opening in the block to the opening 196. The water circulates through the spaces 196 through openings 144 in the reed plate 124 as well as through coextensive openings in the gaskets 140 and 142. The water is removed through an opening 202 which is adapted to receive an output fitting 204 that has a nipple to which a tube can be attached for expelling the water at a convenient location. The fitting 204 has a orifice of approximately ¼ inch when used with an outboard motor having a water pressure of approximately 40 p.s.i. to control the flow rate of the cooling water.

It is important that the temperature of the compressed air be controlled within a particular range. If the temperature exceeds the coking temperature of the lubricating oil used in the compressor, carbon deposits will occur on the top of the piston and will eventually flake off into the compressed air and can then detrimentally affect the operation of the fuel injection system. Also, if the temperature is too low so that water condensation occurs, the water will mix with any oil that may be present in the compressed air output, and a sludge-like mixture will be produced that can also interfere with the operation of the fuel injection system.

Figure 12:
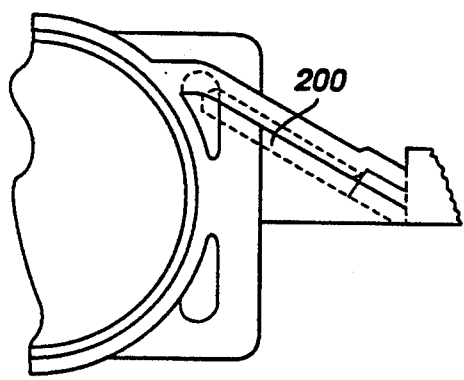
FIG. 12 is a cross-section taken generally along the line 12—12 of FIG. 1.
Figure 13:
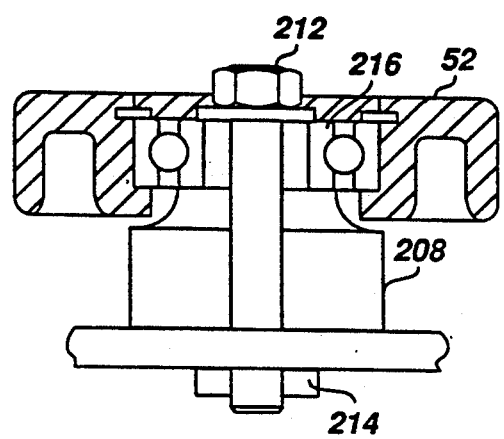
FIG. 13 is a side elevation taken generally along the line 13—13 of FIG. 1.

With respect to the idler pulley 52 shown in FIG. 13, it is mounted so that it can be adjusted to adjust the tension in the belt 58. Referring to FIGS. 1, 12, and 13, the outer extension 46 of the bracket portion 34 has a crescent shaped opening 206 and a hex headed mounting bracket 208 is attached to the extension via a small bolt 210. A wrench applied to the hex shaped bracket 208 can rotate the bracket around the bolt 210 to obtain the desired tension in the belt and when that is done, a bolt 212 having a nut 214 can be tightened to maintain the desired position. The mounting bracket 208 is shown in FIG. 1 in one position and is also shown in another position in phantom. The idler pulley 52 contains an internal bearing 216.

From the foregoing, it should be appreciated that an improved air compressor has been shown and described which has many desirable advantages and attributes. It is compact in construction and yet provides a high pressure output as well as an auxiliary low pressure output and separate power take off capability. The compact design also includes lubricating and cooling capability which insures reliable operation at relatively high operating speeds.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. An air compressor comprising:
   a housing having an elongated cylindrical bore and a generally closed crankcase chamber;
   a piston having a head end portion and a connecting rod end portion and a side wall of predetermined length, said piston being adapted for reciprocating movement in said cylindrical bore;
   a rotatable crankshaft means in said crankcase chamber;
   a connecting rod for interconnecting said crankshaft means and said piston, rotation of said crankshaft means causing reciprocating movement of said piston;
   a head means attached to said housing at the outer end of said cylindrical bore, and having an output chamber therein;
   valve means located adjacent to said outer end of said cylindrical bore, said valve means being normally closed but adapted to open and pass air to said output chamber responsive to compressed air produced by the movement of said piston in said bore toward said head means;
   inlet means for admitting air through at least one opening in said housing into the side of said cylindrical bore, said opening being in communication with the exterior of said housing;
   an outlet means adapted to discharge air from said crankcase chamber, said outlet means having a hollow cylindrical extension adapted to have a conduit means attached thereto;
   means connected to said crankshaft means for rotating the same, incremental rotation of said crankshaft means causing said piston to move away from said head means and permit air to enter said cylindrical bore, further rotation causing said piston to move toward said head means while compressing the air, the air causing said valve means to open and pass into said output chamber and then close.

2. An air compressor as defined in claim 1 wherein said piston has a stroke of first predetermined length, said first predetermined length being greater than twice said piston side wall predetermined length, said inlet means being adapted to admit air into said cylinder bore when said piston is located at either end of its stroke.

3. An air compressor as defined in claim 1 wherein said outlet means includes a check valve normally biased in a closed position and adapted to open responsive to a differential pressure exceeding a predetermined level.

4. An air compressor as defined in claim 3 wherein said predetermine pressure level is within the range of approximately 8 to approximately 10 pounds per square inch.

5. An air compressor as defined in claim 4 wherein said piston has at least a first annular groove located near said head end of said piston adapted to receive a sealing oil ring means, said piston having a plurality of openings communicating said groove with the interior of said piston, said compressor including an oil ring means located in said first annular groove adapted to pass oil from between said cylindrical bore and said piston side wall to the interior of said piston.

6. An air compressor as defined in claim 5 wherein said piston has a second annular groove located between said first annular groove and said head end of said piston, and a second ring means positioned within said second groove.

7. An air compressor as defined in claim 6 wherein said piston has a third annular groove located between said second annular groove and said head end of said piston, and a third ring means positioned within said third groove.

8. An air compressor as defined in claim 1 including oil inlet means adapted to permit oil to be admitted into said crankcase chamber and oil outlet means adapted to discharge oil from said crankcase chamber.

9. An air compressor as defined in claim 8 wherein said oil inlet means is located to admit oil into the upper portion of said crankcase chamber and said oil outlet means is located to discharge oil from the lower portion of said crankcase chamber so that gravity aids in the movement of oil through said crankcase chamber.

10. An air compressor as defined in claim 9 wherein said oil inlet means comprises a check valve biased in a closed position and adapted to admit oil into said crankcase in response to a predetermined differential pressure.

11. An air compressor as defined in claim 10 wherein said predetermined differential pressure is greater than approximately rely 10 pounds per square inch.

12. An air compressor as defined in claim 10 wherein said oil inlet means comprises a check valve having a cylindrical nipple extending outwardly adapted to have an oil line connected thereto.

13. An air compressor as defined in claim 8 wherein said oil outlet means comprises a fitting adapted to have an oil outlet line connected thereto, said fitting having an internal orifice of predetermined size adapted to drain oil from said crankcase chamber while maintaining pressure within said crankcase chamber.

14. An air compressor as defined in claim 1 wherein said valve means comprises a reed plate located between said housing at said outer end of said cylindrical bore and said head means, said reed plate having a plurality of openings for communicating air from said cylindrical bore to said output chamber, and a normally closed reed valve means attached to said reed plate overlying said plurality of openings, and adapted to open in response to a predetermined differential pressure in said cylindrical bore relative to the pressure in said output chamber, said valve means including means for attaching said reed valve means to said reed plate.

15. An air compressor as defined in claim 14 wherein said reed valve means has a generally circular shaped outer peripheral extent and an opening in the center portion thereof, said reed valve means having a plurality of petals extending from said center portion to the outer extent, said petals being adapted to flex away from said reed plate in response to said predetermined differential pressure.

16. An air compressor as defined in claim 14 wherein said differential pressure is greater than approximately 80 pounds per square inch.

17. An air compressor as defined in claim 15 wherein said valve means further includes a reed valve stop member located in said output chamber and abutting said reed valve means, said stop member having an opening in the center portion thereof and being attached to said reed plate by said attaching means, said stop member permitting said reed valve means petals to flex away from said reed plate during operation.

18. An air compressor as defined in claim 17 wherein the shape of said stop member is substantially the same as the shape of said reed valve means and having petals that are slightly smaller than the size of said reed valve means, the outer portion of the petals of said stop member being spaced from said petals of said reed valve means to permit flexing of said petals of said reed valve means.

19. An air compressor as defined in claim 15 wherein said reed valve means is made of stainless steel flapper valve stock having a thickness of approximately 0.011 inches.

20. An air compressor as defined in claim 15 wherein said reed valve means has 8 petals.

21. An air compressor as defined in claim 15 wherein said reed plate has 8 of said openings that communicate air from said cylindrical bore to said outlet chamber.

22. An air compressor as defined in claim 21 wherein the shape of said petals of said reed valve means is substantially the same as the shape of said openings in said reed plate, said petals overlying said openings and overlapping said openings by approximately 0.060 inches along the sides and the end of each of said petals.

23. An air compressor as defined in claim 1 wherein said housing comprising a main casting which includes said cylindrical bore and a portion of said crankcase chamber, said housing including an end casting adapted to be connected to said main casting near said crankcase chamber, said end casting and main casting being connected along a separation line that is coextensive with the center of said crankshaft means so that said piston, connecting rod and crankshaft means can be selectively inserted and removed from said housing when said end casting is removed, and means for attaching said end casting to said main casting.

24. An air compressor as defined in claim 23 wherein said crankcase chamber has an opening on each side thereof, said crankshaft means comprises first and second crankshaft members, each having a cylindrical extension about which said crankshaft member can rotate, each of said cylindrical extensions extending through an associated one of said openings in said housing, said crankshaft means having bearings located on opposite sides thereof for permitting rotation of said crankshaft means.

25. An air compressor as defined in claim 24 wherein said cylindrical extensions have a diameter smaller than said openings in said housing, said crankshaft means including an annular sealing member located between said extensions and said openings, said sealing member being located outside of said bearings.

26. An air compressor as defined in claim 25 wherein said housing has an annular groove located between each of said sealing members and said bearing adjacent thereto, said groove being located in said main casting and said end casting, a retaining ring located in each of said grooves for retaining said crankshaft means and preventing the same from moving in the axial direction of said cylindrical extensions of said crankshaft members.

27. An air compressor as defined in claim 24 wherein said rotating means is connected to said first crankshaft member, and said cylindrical extension of second crankshaft member includes means adapted to connect an auxiliary drive means for powering other apparatus.

28. An air compressor as defined in claim 24 wherein said crankshaft means includes a crankpin connected to each crankshaft member and adapted to maintain the crankshaft members a predetermined distance from one another, said crankshaft means including a bearing for attaching said connecting rod to said crankpin and permit rotational movement between said connecting rod and said crankpin.

29. An air compressor as defined in claim 19 wherein said reed valve means is made of stainless steel flapper valve stock having a thickness of approximately 0.011 inches.

30. An air compressor comprising:
a housing having an elongated cylindrical bore and a generally closed crankcase chamber;
a piston having a head end portion and a connecting rod end portion and a side wall of predetermined length, said piston being adapted for reciprocating movement in said cylindrical bore;
a rotatable crankshaft means in said crankcase chamber;
a connecting rod for interconnecting said crankshaft means and said piston, rotation of said crankshaft means causing reciprocating movement of said piston;
a head means attached to said housing at the outer end of said cylindrical bore, and having an output chamber therein;
valve means located adjacent to said outer end of said cylindrical bore, said valve means being normally closed but adapted to open and pass air to said output chamber responsive to compressed air produced by the movement of said piston in said bore toward said head means.
inlet means for admitting air through at least one opening in said housing into the side of said cylindrical bore, said opening being in communication with the exterior of said housing;
said piston having a stroke of first predetermined length, said first predetermined length being greater than twice said piston side wall predetermined length, said inlet means being adapted to admit air into said cylinder bore when said piston is located at either end of its stroke;

an outlet means adapted to discharge compressed air from said crankcase chamber for use by other equipment;

oil inlet means adapted to permit oil to be admitted into said crankcase chamber and oil outlet means adapted to discharge oil from said crankcase chamber, said oil inlet means being located to admit oil into the upper portion of said crankcase chamber and said oil outlet means being located to discharge oil from the lower portion of said crankcase chamber so that gravity aids in the movement of oil through said crankcase chamber;

means connected to said crankshaft means for rotating the same, incremental rotation of said crankshaft means causing said piston to move away from said head means and permit air to enter said cylindrical bore, while compressing air within said crankcase chamber and providing a secondary compressed air available for discharge through said outlet means;

further rotation of said crankshaft means causing said piston to move toward said head means while compressing the air in said cylindrical bore, the air causing said valve means to open and pass into said output chamber and then close, while admitting air through said at least one opening in said housing into said crankcase chamber.

31. An air compressor as defined in claim 30 wherein said outlet means includes a check valve normally biased in a closed position and adapted to open responsive to a differential pressure exceeding a predetermined level.

32. An air compressor as defined in claim 23 wherein said oil inlet means comprises a check valve biased in a closed position and adapted to admit oil into said crankcase in response to a predetermined differential pressure.

33. An air compressor as defined in claim 32 wherein said predetermined differential pressure is greater than approximately 10 pounds per square inch.

34. An air compressor as defined in claim 30 wherein said oil outlet means comprises a fitting adapted to have an oil outlet line connected thereto, said fitting having an internal orifice of predetermined size adapted to drain oil from said crankcase chamber while maintaining pressure within said crankcase chamber.

35. An air compressor comprising:
a housing having an elongated cylindrical bore and a generally closed crankcase chamber;
a piston having a head end portion and a connecting rod end, said piston being adapted for reciprocating movement in said cylindrical bore;
a rotatable crankshaft means in said crankcase chamber;
a connecting rod for interconnecting said crankshaft means and said piston, rotation of said crankshaft means causing reciprocating movement of said piston;
a head means attached to said housing at the outer end of said cylindrical bore, and having an output chamber therein;
valve means located adjacent to said outer end of said cylindrical bore, said valve means being normally closed but adapted to open and pass air to said output chamber responsive to compressed air produced by the movement of said piston in said bore toward said head means;

inlet means for admitting air through said housing into the side of said cylindrical bore;
means connected to said crankshaft means for rotating the same, incremental rotation of said crankshaft means causing said piston to move away from said head means and permit air to enter said cylindrical bore, further rotation causing said piston to move toward said head means while compressing the air, the air causing said valve means to open and pass into said output chamber and then close;
oil inlet means adapted to permit oil to be admitted into said crankcase chamber and oil outlet means adapted to discharge oil from said crankcase chamber, said oil inlet means comprising a check valve biased in a closed position and adapted to admit oil into said crankcase in response to a predetermined differential pressure.

36. An air compressor as defined in claim 35 wherein said predetermined differential pressure is greater than approximately 10 pounds per square inch.

37. An air compressor as defined in claim 35 wherein said oil inlet means is located to admit oil into the upper portion of said crankcase chamber and said oil outlet means is located to discharge oil from the lower portion of said crankcase chamber so that gravity aids in the movement of oil through said crankcase chamber.

38. An air compressor as defined in claim 35 wherein said piston has a stroke of first predetermined length and a side wall of predetermined length, said first predetermined length being greater than twice said piston side wall predetermined length, said inlet means being adapted to admit air into said cylinder bore when said piston is located at either end of its stroke.

39. An air compressor as defined in claim 35 including an outlet means adapted to discharge air from said crankcase chamber, said outlet means having a hollow cylindrical extension adapted to have a conduit means attached thereto.

40. An air compressor comprising:
a housing having an elongated cylindrical bore and a crankcase chamber;
a piston having a head end portion and a connecting rod end portion, said piston being adapted for reciprocating movement in said cylindrical bore;
a rotatable crankshaft means in said crankcase chamber;
a connecting rod for interconnecting said crankshaft means and said piston, rotation of said crankshaft means causing reciprocating movement of said piston;
a head means attached to said housing at the outer end of said cylindrical bore, and having an output chamber therein;
valve means located adjacent to said outer end of said cylindrical bore, said valve means being normally closed but adapted to open and pass air to said output chamber responsive to compressed air produced by the movement of said piston in said bore toward said head means;
inlet means for admitting air through said housing into the side of said cylindrical bore;
means connected to said crankshaft means for rotating the same, incremental rotation of said crankshaft means causing said piston to move away from said head means and permit air to enter said cylindrical bore, further rotation causing said piston to move toward said head means while compressing the air, the air causing said valve means to open and pass into said output chamber and then close;

said housing comprising a main casting which includes said cylindrical bore and a portion of said crankcase chamber, said housing including an end casting adapted to be connected to said main casting near said crankcase chamber, said end casting and main casting being connected along a separation line located at the center of said crankshaft means so that said piston, connecting rod and crankshaft means can be selectively inserted and removed from said housing when said end casting is removed, and means for attaching said end casting to said main casting.

41. An air compressor as defined in claim 40 wherein said crankcase chamber has an opening on each side thereof, said crankshaft means comprises first and second crankshaft members, each having a cylindrical extension about which said crankshaft member can rotate, each of said cylindrical extensions extending through an associated one of said openings in said housing, said crankshaft means having bearings located on opposite sides thereof for permitting rotation of said crankshaft means.

42. An air compressor as defined in claim 41 wherein said cylindrical extensions have a diameter smaller than said openings in said housing, said crankshaft means including an annular sealing member located between said extensions and said openings, said sealing member being located outside of said bearings.

43. An air compressor as defined in claim 42 wherein said housing has an annular groove located between each of said sealing members and said bearing adjacent thereto, said groove being located in said main casting and said end casting, a retaining ring located in each of said grooves for retaining said crankshaft means and preventing the same from moving in the axial direction of said cylindrical extensions of said crankshaft members.

44. An air compressor comprising:
a housing having an elongated cylindrical bore and a generally closed crankcase chamber;
a piston having a head end portion and a connecting rod end portion, said piston being adapted for reciprocating movement in said cylindrical bore;
a rotatable crankshaft means in said crankcase chamber;
a connecting rod for interconnecting said crankshaft means and said piston, rotation of said crankshaft means causing reciprocating movement of said piston;
a head means attached to said housing at the outer end of said cylindrical bore, and having an output chamber therein;
valve means located adjacent to said outer end of said cylindrical bore, said valve means being normally closed but adapted to open and pass air to said output chamber responsive to compressed air produced by the movement of said piston in said bore toward said head means, said output chamber having a predetermined nominal output pressure;
said valve means comprising a support plate located between said housing at said outer end of said cylindrical bore and said head means, said support plate having a plurality of openings for communicating air from said cylindrical bore to said output chamber, and a normally closed reed valve means attached to said support plate overlying said plurality of openings, and adapted to open in response to a predetermined differential pressure in said cylindrical bore relative to the pressure in said output chamber, said valve means including means for attaching said reed valve means to said support plate, said reed valve means being of sufficient size and thickness so that it does not deform in response to the pressure in said outlet chamber, said nominal output pressure being approximately 15 to approximately 20 times greater than said differential pressure;
inlet means for admitting air through said housing into the side of said cylindrical bore;
means connected to said crankshaft means for rotating the same, incremental rotation of said crankshaft means causing said piston to move away from said head means and permit air to enter said cylindrical bore, further rotation causing said piston to move toward said head means while compressing the air, the air causing said valve means to open and pass into said output chamber and then close.

45. An air compressor as defined in claim 44 wherein said nominal output pressure is approximately 80 pounds per square inch.

46. An air compressor as defined in claim 44 wherein said valve means is located between said housing and said head means, said valve means includes having openings for communicating said space between said inner and outer side walls of said head means and the space between the inner and outer walls of said housing.

47. An air compressor as defined in claim 46 wherein said reed valve means has a generally circular shaped outer periphery and an opening in the center portion thereof, said reed valve means having a plurality of petals extending from said center portion to the outer periphery, said petals being adapted to flex away from said reed plate in response to said predetermined differential pressure.

48. An air compressor as defined in claim 47 wherein said differential pressure is greater than approximately 80 pounds per square inch.

49. An air compressor as defined in claim 48 wherein said valve means further includes a reed valve stop member located in said output chamber and abutting said reed valve means, said stop member having an opening in the center portion thereof and being attached to said reed plate by said attaching means, said stop member permitting said reed valve means petals to flex away from said reed plate during operation.

50. An air compressor as defined in claim 49 wherein the shape of said stop member is substantially the same as the shape of said reed valve means and having petals that are slightly smaller than the size of said reed valve means, the outer portion of the petals of said stop member being spaced from said petals of said reed valve means to permit flexing of said petals of said reed valve means.

51. An air compressor as defined in claim 47 wherein said reed valve means has 8 petals.

52. An air compressor as defined in claim 47 wherein said reed plate has 8 of said openings that communicate air from said cylindrical bore to said outlet chamber.

53. An air compressor as defined in claim 52 wherein the shape of said petals of said reed valve means is substantially the same as the shape of said openings in said reed plate, said petals overlying said openings and overlapping said openings by approximately 0.060 inches along the sides and the end of each of said petals.

54. An air compressor comprising:
- a housing having an elongated cylindrical bore and a generally closed crankcase chamber;
- a piston having a head end portion and a connecting rod end portion and a side wall of predetermined length, said piston being adapted for reciprocating movement in said cylindrical bore;
- said piston having at least a first annular groove located near said head end of said piston adapted to receive a sealing oil ring means, said piston having a plurality of openings communicating said groove with the interior of said piston, and an oil ring means located in said first annular groove adapted to pass oil from between said cylindrical bore and said piston side wall to the interior of said piston;
- a rotatable crankshaft means in said crankcase chamber;
- a connecting rod for interconnecting said crankshaft means and said piston, rotation of said crankshaft means causing reciprocating movement of said piston;
- a head means attached to said housing at the outer end of said cylindrical bore, and having an output chamber therein;
- valve means located adjacent to said outer end of said cylindrical bore, said valve means being normally closed but adapted to open and pass air to said output chamber responsive to compressed air produced by the movement of said piston in said bore toward said head means;
- inlet means for admitting air through said housing into the side of said cylindrical bore;
- means connected to said crankshaft means for rotating the same, incremental rotation of said crankshaft means causing said piston to move away from said head means and permit air to enter said cylindrical bore, further rotation causing said piston to move toward said head means while compressing the air, the air causing said valve means to open and pass into said output chamber and then close.

55. An air compressor as defined in claim 54 wherein said piston has a second annular groove located between said first annular groove and said head end of said piston, and a second ring means positioned within said second groove.

56. An air compressor as defined in claim 55 wherein said piston has a third annular groove located between said second annular groove and said head end of said piston, and a third ring means positioned within said third groove.

* * * * *